Aug. 29, 1933.　　W. C. KENNEDY　　1,924,558
SPEED CONTROL APPARATUS
Filed Nov. 11, 1932　　3 Sheets-Sheet 1

INVENTOR:
WALTER C. KENNEDY
ATTORNEY

Aug. 29, 1933.　　　W. C. KENNEDY　　　1,924,558
SPEED CONTROL APPARATUS
Filed Nov. 11, 1932　　　3 Sheets-Sheet 2

INVENTOR:
WALTER C. KENNEDY
By
ATTORNEY

Aug. 29, 1933. W. C. KENNEDY 1,924,558

SPEED CONTROL APPARATUS

Filed Nov. 11, 1932 3 Sheets-Sheet 3

INVENTOR:
WALTER C. KENNEDY
By Leon Edelson
ATTORNEY

Patented Aug. 29, 1933

1,924,558

UNITED STATES PATENT OFFICE 1,924,558

SPEED CONTROL APPARATUS

Walter C. Kennedy, Llanerch, Pa.

Application November 11, 1932
Serial No. 642,165

27 Claims. (Cl. 172—293)

This invention relates generally to speed regulator systems and more particularly to a system and apparatus for and method of obtaining and maintaining a predetermined relation between the speeds of rotation of two or more units of a multiple-unit machine. Expressed somewhat differently, this invention relates more particularly to a system for maintaining a substantially constant-speed ratio between a plurality of individually driven units of a machine.

The invention is particularly applicable for use in controlling the speeds of the several prime movers respectively employed to drive the several sections or units of such machines as are used in the manufacture of paper and strip steel, these machines being characterized by the fact that they are composed of a number of individually driven units through which the product undergoing manufacture is progressively and successively fed. In the paper mills, the material of which the paper is formed is initially introduced at the wet end of the machine and as the paper, in the course of its manufacture, progresses through the machine, it continuously shrinks due to the extraction of moisture therefrom, this shrinking of the paper causing a progressively decreasing rate of travel through the machine thereby necessitating reductions in the speeds of the several units or sections of the machine through which the paper is fed. In other words, the rate of travel of the paper through the machine being decreased as it approaches the calender end thereof, it is necessary that the speed of each unit or section of the machine be less than the speed of the unit or section immediately preceding it. Also, in order to insure constantly correct linear speed of the paper through the several units or sections of the machine, it is absolutely necessary that a proper ratio of speed between the several units or sections of the machine be at all times maintained and it is also necessary that these speed ratios be capable of independent adjustment.

In the continuous tandem steel mill which is employed for making steel strip and the like, a reverse action is had. In this type of continuous mill, the steel being rolled is increased in length as it progresses through the machine and accordingly each unit of the mill must operate at a speed somewhat greater than that of the immediately preceding unit in order to accommodate the increasing rate of travel of the material through the machine.

As has been stated above, this invention is applicable to either of the above types of machine or to any other machine consisting of individually driven sections each of which must be driven at a somewhat different speed from another section. In all of such machines, however, it is essential, once the machine is properly adjusted throughout, that the speeds of the different units or sections bear a fixed relation to each other and to attain this is one of the objects of the present invention.

Not only is it essential that the speeds between the several sections or units of the machine bear a constant fixed relation to each other, but it is also essential that some provision be made for varying the ratio between any two sections of the machine. Also, it is essential that some provision be made to vary the speed of the machine as a whole to suit the quality or condition of the material being handled. It is accordingly among the further objects of this invention to provide a system for regulating the speeds of the prime movers of the several units or sections of the machine either independently of each other or collectively, it being understood, however, that when the speeds of the several prime movers are collectively increased or decreased, the speed ratios between the several sections or units of the machine are maintained constant.

The fact is appreciated that heretofore and prior to the present invention various systems and apparatuses have been employed for regulating and controlling the speeds of the prime movers employed for operating the several sections or units of a continuous mill. In certain of these systems use has been made of cone pulleys and belts, or of frictional rolls in contact with discs, which operate rheostats to decrease or increase the magnetic fields of direct current motors to thereby regulate their speeds, the direct current motor serving as the prime mover. Due to slippage, it was found that the frictional means for operating the rheostats were not entirely satisfactory. Another known apparatus employs alternating current generators in conjunction with synchronous motors and other more or less expensive and bulky mechanisms for regulating the speeds of the several sections or units in a continuous mill. All of these known systems involved the use of cumbersome apparatus and devices which were necessarily positioned in the immediate vicinity of the machine the speed of which was to be regulated, in consequence of which they occupied valuable space at the same time that they constituted obstructions preventing free access to the machine during the operation thereof.

It is among the objects of the present invention to provide a system of the character and for the purposes aforesaid wherein the essential element employed for regulating the speeds of the several sections or units of the machine either individually or collectively operates in accordance with gyroscopic principles thereby providing very positive and quick responses to speed changes and effecting the necessary energization of the prime movers the speeds of which are to be controlled. Among the advantages of the system constructed and operated in accordance with the present invention are the following: the gyroscopic speed regulator mechanism is capable of installation at a point remote from the machine the speed of which is to be controlled; it is of such simple construction and of such small size that it occupies a very small space and accordingly any number of them can be conveniently installed at a central station from which the speeds of a number of continuous machines may be controlled; and it is possible, by the use of the present system, to increase or decrease individually or collectively the operating speeds of the several units or sections of a continuous paper mill or steel rolling mill from a remote station.

To sum up the foregoing, the present invention provides a system for and method of speed control and regulation which permits, first, overall variation of the machine to meet varying requirements due to differences in the type and character of the material being processed; second, independent adjustment of the various sections or units of the machine to insure the requisite draw between successive sections or units; third, the maintenance of a constant-speed ratio between the several sections or units when the respective speeds thereof have once been adjusted as desired; and fourth, the variation of the speeds of all of the units collectively without affecting the predeterminedly fixed speed ratios between successive units.

A still further object of the invention is to provide a speed regulating apparatus which is direct and positive in its action and extremely sensitive to speed variations for controlling the speed of any prime mover within extremely narrow limits. In addition, it is among the general objects of this invention to provide a speed regulating apparatus and system which is not only extremely simple in operation and relatively inexpensive to install, but which obviates the necessity of employing individual cone pulley drives and other frictional devices which are subject to slippage and other objectional difficulties, which is extremely accurate and sensitive in operation and not likely to get out of adjustment, which eliminates the necessity of employing expensive lay shafts, differential gears, belt-shifting mechanisms and other such cumbersome and expensive devices, and which is capable of being installed in a remotely located control room where ideal conditions for inspection, adjustment and maintenance are obtainable.

Other objects relating to details and economies resulting from the construction and operation of the apparatus and method of the present invention will appear more fully hereinafter.

The invention consists substantially in the combination, construction, location and relative arrangement of parts, all as will appear more fully in the following description, as shown in the drawings and as finally pointed out in the appended claims. For purposes of illustration, the invention has been shown in the drawings and has been described hereinafter as applied to a paper mill and it will be understood that such disclosure is for illustrative purposes solely and that the invention is equally applicable to other types of machines.

In the accompanying drawings:—

Figure 5 is a front elevational view of the gyroscope unit with the precession motor thereof removed;

Figure 6 is a vertical cross-sectional view taken substantially on the line 6—6 of Figure 5;

Figure 7 is a diagrammatic representation of a portion of the system shown in Figure 2 illustrating the use of a carbon pile rheostat for governing the speed of the prime mover, which latter, in the instance shown, is an electric motor; and Figure 8 is also a diagrammatic representation of a portion of the regulating and controlling system wherein the prime mover is a mechanical apparatus, such as a steam turbine or the like.

Figure 1:
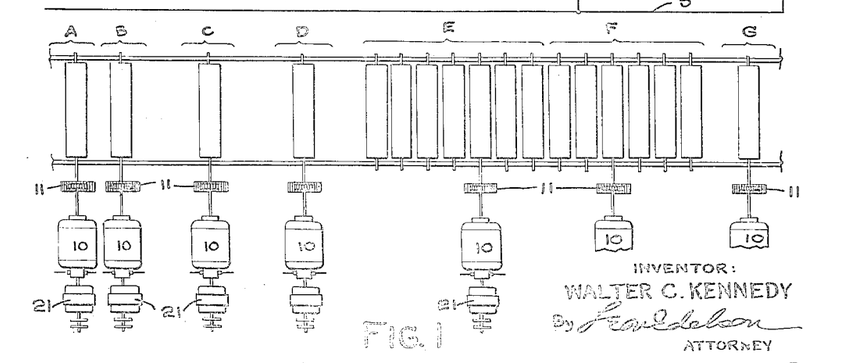
Figure 1 is a general plan view of a portion of a paper making machine the speed regulation and control of which is effected by the system and apparatus of the present invention.

Referring now more particularly to the drawings, it will be observed that the system of speed regulation embodying the principles of the present invention has been illustrated as applied to a sectional paper machine such as is shown more or less diagrammatically in Figure 1 and which includes the several individually driven sections or units A, B, C, D, E, F and G. The section A comprises what is ordinarily known as the couch rolls, the sections B, C and D comprise the presses, the sections E and F comprise the dryers, and the final section G comprises the calender rolls. Each of these sections or units is individually driven by a direct current adjustable speed motor 10, these main driving motors being suitably coupled to the driven sections by means of reduction gears 11. It is with the control and regulation of the speeds of these main driving motors 10 that this invention is concerned, it being understood that the requisite "draw" between the several sections or units A, B, C, etc. is obtained by proper adjustment and maintenance of the driving motor speeds. As has already been stated, in a machine of the type illustrated the speed of the motor 10 which drives section A is somewhat greater than that of the motor driving section B, the speed of the latter motor being greater than that which drives section C, and so on down the line, the motor driving the calender unit G being of slowest speed. Variations in speed of the driving motors 10 is obtained by individual shunt field control, the field coil 12 of each motor (see Figure 2) being connected to the main direct current supply wires 1 and 2 through a field rheostat 13 driven by a small motor 14, the shaft of this latter motor being coupled to that of the field rheostat 13 by a worm gear drive 15. The main motors 10 are commonly connected to the main direct current supply wires 1 and 2, each motor being preferably provided with an individual starting device 16.

In order to regulate the speeds of the driving motors 10 there are employed an alternating current motor generator set 17 and a speed regulator mechanism 18. Whereas only a single motor-generator set 17 is employed for all of the driving motors 10, separate regulator mechanisms 18 are employed for each driving motor. Inasmuch as the operation of the system is the same for each motor, it will be described in connection with only one of the motors and it has been so illustrated in Figure 2. The generator 19 of the motor-generator set 17, which is preferably termed the master generator, is designed to supply alternating current at any desired voltage and frequency and to this end is driven by a direct current adjustable speed motor 20, this motor being also connected to the main direct current supply wires 1 and 2, through a suitable starting device 20'.

Figure 2:
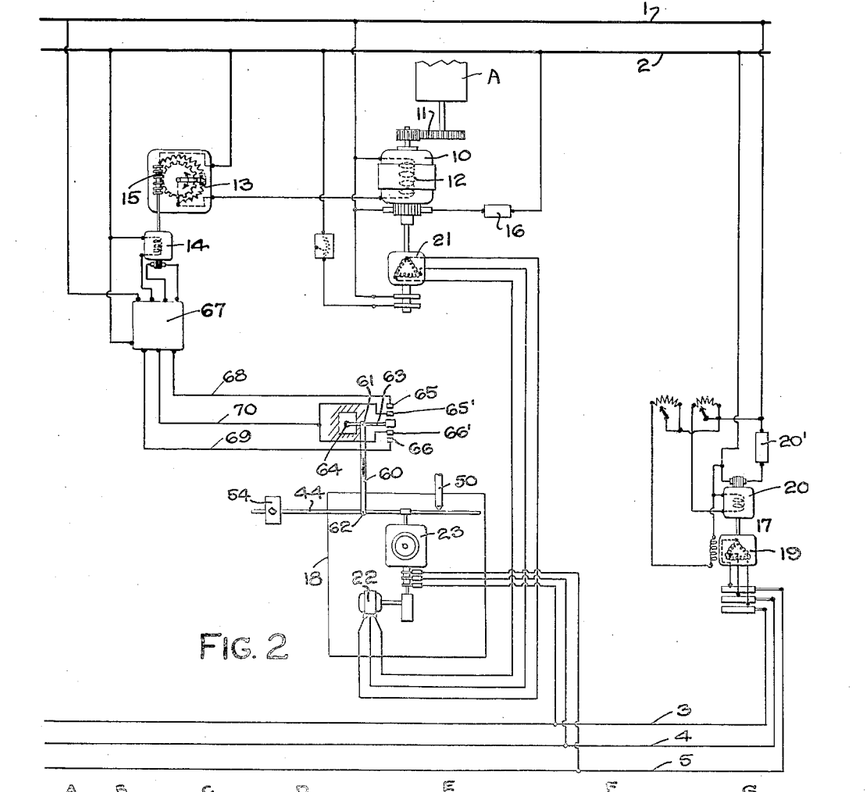
Figure 2 is a diagrammatic representation of the regulating and controlling system as applied to one of the units of the machine shown in Figure 1.
Figure 3:
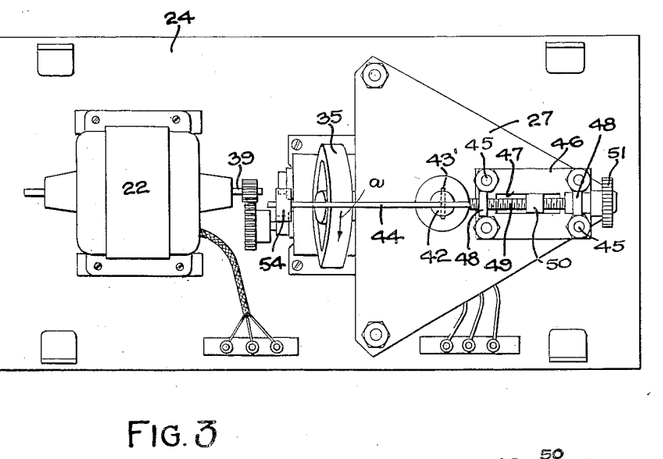
Figure 3 is a top plan view of the gyroscope unit for effecting the regulation and control of the speed of the machine.

Coupled to each of the driving motors 10 and adapted to be driven thereby is a small alternating current generator 21, each of these generators being designed to deliver an alternating current of a voltage and frequency determined by and dependent upon the speed of the particular driving motor 10 with which it is operatively associated. In the illustrated arrangement it will be observed that the master generator 19 and the motor-coupled generator 21 are of the three-phase type and that the system generally is of the three-phase alternating current type. It will be understood, however, that the system is in no sense limited to the use of three-phase alternating current apparatus and that wherever alternating current is required in the system it may be supplied either as single or multiple phase without departing from the principles of the invention.

Referring now briefly to the speed regulator mechanism 18 as shown in Figure 2, it will be observed that it essentially includes two synchronous type motors 22 and 23. The motor 22 is preferably termed the "precession" motor, while the motor 23 is preferably termed the "spin" motor. In the particular arrangement shown, the precession motor 22 is supplied with energy from the generator 21 driven by the motor 10 the speed of which is to be regulated, it being understood that all of the driving motors 10 are similarly provided with generators 21 for respectively supplying current to separate precession motors 22. The spin motors 23 are all commonly supplied with energy from the master generator 19 through the alternating current supply lines 3, 4 and 5.

If desired, and in some cases it may be preferable, the spin motors 23 of the several speed regulating mechanisms 18 may be respectively supplied with current from the generators 21, in which event the precession motors would be commonly supplied with current from the master generator 19, all without changing the operation of the system.

Inasmuch as the precession motors 22 are of the synchronous type, the speed of rotation of each is the same or some multiple of the rotative speed of the particular driving motor 10 with which it is operatively associated and accordingly the speeds of the several precession motors are respectively proportional to the speeds of the several driving motors 10. The same is true of the spin motors 23 in that the speeds thereof are always directly proportional to the rotative speed of the master generator 19.

Before proceeding further with a description of the system of speed regulation, reference is made to Figures 3 to 6 wherein is more particularly shown the speed regulating mechanism per se. This mechanism, which includes the precession and spin motors 22 and 23, operates generally in accordance with gyroscopic principles and laws. In general, this mechanism comprises a unitary assembly including a base 24 upon which is mounted the precession motor 22 and the supporting structure for the spin motor 23 and its operatively associated appurtenances. Suitably supported in vertically spaced relation above the base 24, preferably by means of vertical rods or posts 25, are a pair of plates 26 and 27. Journalled between these plates 26 and 27 for rotation about a vertical axis (which is hereinafter termed the precession axis) is a saddle or frame 28. The bottom member 29 of this saddle 28 is provided with a vertically extending stem 30 which projects downwardly through an aperture provided in the bottom plate 26. The upper member 31 of the saddle 28 is provided with a vertically extending tubular trunnion 32 projecting upwardly through an aperture in the upper plate 27, the stem 30 and the trunnion 32 being axially coincident to insure a vertically extending axis of rotation for the saddle 28.

Secured to and extending oppositely from each side of the spin motor casing are a pair of trunnions 33 and 34 which are respectively journalled in the opposite vertical side members of the saddle 28. It will be apparent from the foregoing description that the spin motor 23 is not only capable of rotation about the axis of its rotor, but it is also capable of being bodily rotated about a vertical axis lying in the vertical plane of its rotor axis at the same time that it is capable of being tilted about a horizontal axis extending normal to said vertical plane. Secured to the opposite ends of the rotor shaft of the spin motor 23 for rotation therewith are a pair of fly-wheels 35—35.

The bottom stem or trunnion 30 of the spin motor saddle or frame 28 projects below the bottom plate 26 and is provided with a bevel gear 36 adapted for mesh engagement with a similar gear 37 carried by the driven shaft 38 of a suitable gear reduction train coupled to and driven by the shaft 39 of the precession motor 22. Preferably, the downwardly projecting trunnion 30 of the spin motor frame is provided with a plurality of suitably insulated terminal collars 40 from which leads extend through the cable 41 to the spin motor 23, it being understood that the terminal collars 40 are respectively electrically connected to the alternating current supply wires 3, 4 and 5 leading to the master generator 19.

Projecting downwardly through the upwardly extending tubular trunnion 32 of the spin motor frame 28 is a vertically movable stem 41 having an enlarged bifurcated head 42, the bottom end 43 of the stem extending normally to a point within the frame and above the spin motor casing. Resting within the bifurcated head 42 of the stem 41 and pivotally secured thereto by a pin 43' is a lever 44, this lever being so arranged that it lies substantially in the vertical plane of the spin motor rotor axis or in a plane paralleling said vertical plane.

Mounted upon the upper plate 27 by means of vertical rods 45 or the like is a plate 46 having therein a longitudinal slot 47. Adjacent opposite ends of this slot 47 are a pair of upstanding bearings 48 and 48 within which are commonly journalled a horizontally extending screw 49. Threadedly engaging this screw 49 and projecting downwardly through the slot 47 is a fulcrum element 50 the lower end of which engages the lever 44. It will be observed that the screw 49 is so arranged that while it is free to rotate about its longitudinal axis, it is axially immovable in consequence of which rotation of the screw will cause the fulcrum element to longitudinally traverse the slot 47. The screw 49 is provided at one end thereof with an operating knob 51. The screw, of course, lies in the vertical plane of the lever 44 so as to insure the fulcrum element 50 engaging the lever throughout the entire range of travel of the fulcrum element. Preferably, some means is provided to maintain the lever against lateral displacement, a plate 52 having a slotted edge being preferably employed for this purpose, the end 53 of the lever being received within said slotted edge. The opposite end of the lever is provided with a counterbalancing weight 54 which is adjustable longitudinally along the lever.

Figures 5, 6, 7, 8:
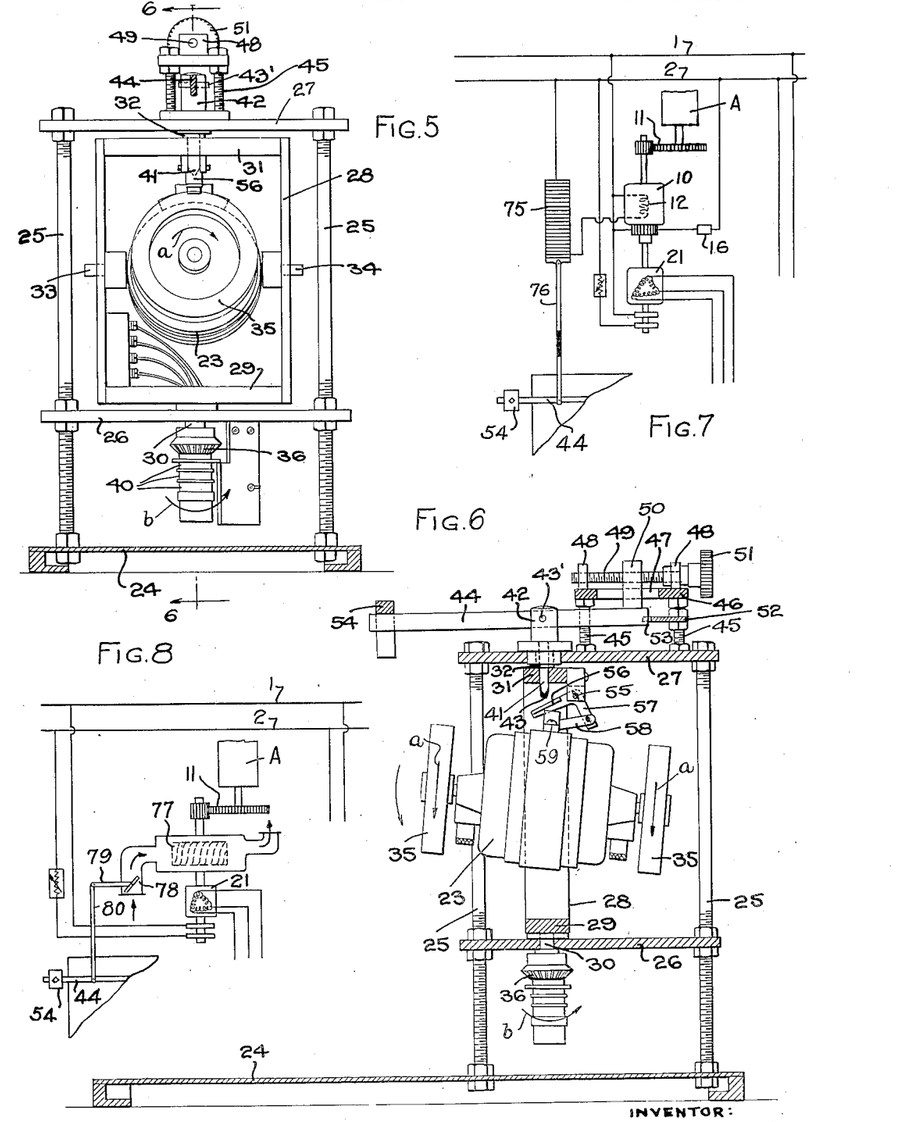

Suitably pivoted, at at 55, to the upper horizontal member 31 of the spin motor frame is a bell crank lever, one arm 56 of which is so arranged that it intersects the vertical axis of the stem 41. The other arm 57 of this bell-crank lever is connected by means of a link 58 to the top of the spin motor casing, as at 59. The arrangement of this bell-crank lever is such that as the spin motor oscillates or tilts about the horizontal axis of the trunnions 33 and 34, a vertical movement is imparted to the stem 41 which in turn causes the weighted end of the lever 44 to be raised or lowered. In Figure 6 the spin motor is in such position that the bell crank lever arm 56 is in its lowermost position. However, should the spin motor be tilted in a counter-clockwise direction, the arm 56 will immediately engage the stem 41 and through it will effect the raising of the lever 44 about the element 50 as a fulcrum. Obviously, by varying the position of the fulcrum element 50 axially of the screw 49 the upward thrust of the lever 44 will be correspondingly altered. A greater or lesser degree of movement of the lever 44 is thus obtainable for any given angular tilt of the spin motor 23 and setting of the counterbalancing weight 54.

Operatively associated with the movable lever 44 is any suitable means for effecting the desired operation of the motor 14 which operates the rheostat 13 controlling the shunt field of the driving motor 10. In its simplest form this means may include a link 60 the opposite ends of which are pivotally secured, as at 61 and 62, (see Figure 2) to a movable switch actuating member 63. One end of member 63 is pivotally secured, as at 64, to any fixed support while the opposite end thereof is disposed between two sets of switch terminals 65—65' and 66—66'. The link 60 and the member 63 are preferably suitably insulated from the switch terminals 65 and 66. The switch terminals 65—65' and 66—66' are electrically connected to a magnetic reverse switch 67 through the wires 68, 69 and 70, the latter wire being commonly connected to the terminals 65' and 66'. Depending upon the direction of movement of the lever 44, the switch terminals 65—65' or the switch terminals 66—66' will be bridged in consequence of which the motor 14 will be caused to operate in one direction or the other, thus increasing or decreasing the resistance in the shunt-field circuit of the driving motor 10. It is in this manner that the speed of the motor 10 is regulated and controlled.

A brief discussion of the gyroscopic laws involved will be helpful, it is believed, in obtaining a clear understanding of the principles of this invention. In the system illustrated and described, there is operating in effect a gyroscope including the spin motor 23 of which the rotor and flywheels are spinning or rotating in a given direction and at a relatively high speed (say 2000 R. P. M.) about the axis of the rotor shaft. At the same time the spin motor is rotating bodily with its supporting frame 28 at a relatively low speed (say 5 to 10 R. P. M.) about the vertical axis, that is, about an axis coincident with the common axis of the vertical trunnions of the frame 28, the rotative speed of the spin motor assembly about said vertical axis being dependent upon and so directly proportional to the speed of the driving motor with which the regulator is associated, and which it is desired to regulate.

In accordance with the laws governing gyroscopic action, the spin motor will tend to tilt about the horizontal axis of the trunnions 33—34, the torque tending to produce this tilting action being of definite value for any given set of conditions. This may be expressed mathematically as follows:—

$$T = K.A.B.C$$

wherein T represents the torque; K is a constant factor depending upon any set of given conditions; A represents the product of the mass of the rotating parts and the square of the radius of gyration; B represents the rotative speed of the spinning parts about the axis of the spin motor rotor shaft; and C represents the rotative speed of the spin motor assembly about the vertical axis intersecting the rotor axis.

Considering the product K.A constant for any given structure and set of conditions and representing this product as $K_1$, the above equation may be expressed more simply as follows:—

$$T = K_1. B. C.$$

Applying the above to the system and arrangement disclosed, it will be apparent that a definite torque is produced about the horizontal axis of the trunnions 33—34 which is directly proportional to the product of the speeds of the precession motor 22 and the spin motor 23. The direction of this torque being dependent upon the relative rotative directions of these motors, it is obvious that opposite torque directions may be obtained by the simple expedient of changing the wiring connections to one or the other of the motors 22 and 23. If we assume that these motor connections are such as to produce a torque which tends to tilt the spin motor 23 in the direction of the arrow shown in Figure 6 (i. e. in a counter-clockwise direction), the torque may be balanced by the system of levers, fulcrum and counterbalancing weight which is operatively associated with the spin motor. The upward thrust of the bell-crank lever arm 56 against the stem 41 is thus directly proportional to the torque produced about the horizontal axis aforesaid. As the torque increases the stem 41 is thrust upwardly and as the torque decreases the stem is thrust downwardly by the action of the counterbalancing weight 54 on the end of the lever 44. Thus, it will be seen that the stem 41, and accordingly the lever 44, follows closely and at all times the tilting movement of the spin motor assembly about its horizontal axis.

Relating all of the foregoing to the particular machine illustrated, it will first be understood that in actual operation of the system the master generator 19 supplies current commonly to the spin motors 23 of all the regulators, all of the spin motors being thus operated at the same speed. Should the speed of any one of the driving motors 10 drop below that desired to be maintained, due to a variation in the material traversing the particular section or unit driven by that motor or for any other cause, the generator 21 which is driven by the motor in question will also slow down in consequence of which there will be caused a corresponding or proportional reduction in the speed of that precession motor 22 which is energized by said generator 21. This reduction in the speed of the precession motor results in a decrease in the rotative speed of the spin motor assembly about its vertical axis or, in other words, it retards the precession velocity of the spin motor assembly, thereby causing the spin motor to tilt about its horizontal axis in the direction of the arrow shown in Figure 6.

This clockwise tilting movement of the spin motor is transmitted, through the bell-crank lever and the stem 41, to the lever 44, causing the weighted end of the latter to drop in consequence of which the switch terminals 66—66' are bridged, thereby closing the circuit to the motor 14 operating the shunt field rheostat 13, the latter being thus operated to weaken the shunt field of the driving motor 10 whereby to increase the speed thereof to its normal and proper value.

On the other hand, should the speed of the particular driving motor 10 in question have been increased beyond its normal operating speed, the generator 21 operatively associated therewith will also increase in speed and thereby cause an increase in the speed of the precession motor 22, resulting in a corresponding increase in the rotative speed of the spin motor assembly about its vertical axis. This produces a counterclockwise tilting of the spin motor assembly, resulting in a raising of the bell-crank lever arm 56 and a corresponding raising of the stem 41 and the weighted end of the lever 44, thereby closing the switching terminals 65—65' and so effecting a reversal in the direction of the motor 14 operating the field rheostat 13. The strength of the field of the driving motor is thus increased, in consequence of which the speed of the driving motor 10 is lowered to its normal and proper value.

Figure 4:
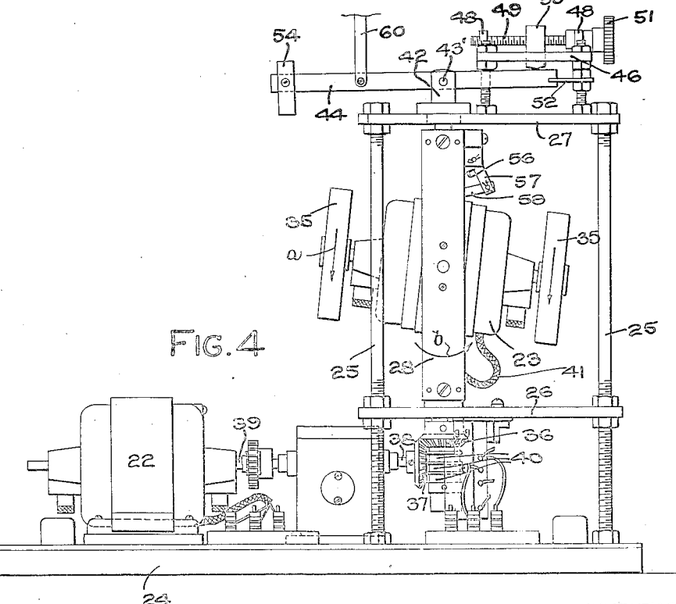
Figure 4 is a side elevational view of the gyroscope unit.

It will be understood that in order for the regulator mechanism to operate in the manner described, the connections to the precession motor 22 and to the spin motor 23 are such that as the rotor of the spin motor and the fly-wheels associated therewith rotate in the direction of the arrows $a$ (see Figures 3, 5 and 6), the spin motor assembly which includes its supporting frame 28 precesses or rotates about its vertical axis in the direction indicated by the arrows $b$ (see Figures 4 and 6).

When the driving motors 10 are all operating at proper speed, there will be no change effected in the speeds of the respective precession motors 22, as a result of which the levers 44 will each assume such neutral position as to maintain both sets of switch terminals 65—65' and 66—66' open, the motor operated shunt field rheostats 13 being thus rendered inoperative. In actual operation, however, the lever 44 would probably be in continuous operation to effect the closing of first one and then the other of the sets of switch terminals 65—65' and 66—66' controlling each driving motor 10, the extent of this operation being dependent upon the degree of speed regulation desired.

In the foregoing description, it was assumed that the relative speeds of the several main driving motors had been adjusted to given values and the description of the operation of the system was confined to the regulation and maintenance of said predeterminedly adjusted relative speeds. Suppose now that all of the motor speeds are the same and it is desired to increase or decrease the speeds thereof. This may be effected by the simple expedient of varying the speed of the master generator 19. If the speeds of the driving motors 10 are to be increased, the speed of the master generator 19 is decreased in consequence of which the speeds of all of the spin motors are uniformly and simultaneously decreased, resulting in the spin motor assemblies being uniformly tilted about their horizontal axes so as to permit the stems 41 and the weighted ends of the levers 44 to move downwardly and so effect the bridging of the switch terminals 66—66' to uniformly increase the speeds of the driving motors 10. Thereafter, any variation in the speed of any of these motors 10 would be reflected in the speed of that precession motor 22 which is associated therewith, the regulator mechanism being then operative to bring the speed of the driving motor to normal value, as explained above. Should it be desired to uniformly and simultaneously reduce the speeds of the several driving motors 10, the master generator 19 is increased in speed, the operation being then the reverse of that just described.

In the immediately preceding discussion, it was assumed that all of the driving motors were operating at the same speed. Suppose now that it is desired to so regulate the speeds of the several driving motors that each operates at a speed somewhat less than the immediately preceding motor. In other words, suppose it is desired that section A motor operate at 1000 R. P. M., section B motor at 950 R. P. M., section C motor at 900 R. P. M. and so on, section G motor operating at slowest speed. To attain this desired adjustment, the fulcrums 50 of the several regulators respectively associated with the motors 10 are individually adjusted to vary the effective lengths of the several levers 44. Thus, as the fulcrum 50 is shifted toward the weighted end of its respective lever, the effective force of the weight 54 is increased, increasing the force applied to the stem 41, and, thereby increasing the tilting torque of the spin motor assembly about its horizontal axis. As this torque increases, the inclination or tilt of the spin motor assembly increases in the direction of the arrow shown in Figure 6 in consequence of which the speed of the driving motor is increased.

Conversely, by adjusting the fulcrum 50 outwardly and away from the weighted end of the lever 44, the speed of the driving motor may be reduced. It will thus be apparent that by individually varying the fulcrum settings of the several regulator mechanisms, the several driving motors may be driven at respectively different desired speeds. Such individual adjustment of the several fulcrums to obtain different motor speeds is not affected by a change in the overall speed of the machine, this being a feature which is very much to be desired.

Thus, assuming that the several driving motors 10 have been individually adjusted in the manner just described to operate respectively at 1000 R.P.M., 950 R.P.M., 900 R.P.M. and so on. Suppose now that it is desired to speed up the operation of the machine as a whole without however affecting the speed ratios between successive motors. This is accomplished by varying the speed of the master generator 19 as explained above so as to collectively increase the speeds of the several driving motors in the same proportional amount. In other words, if the speed of the initial motor is increased five per cent. so that it operates at 1050 R.P.M. instead of 1000 R.P.M., then all of the motors would be speeded up five per cent. and in the example just given the speeds would be 1050 R.P.M., 997.5 R.P.M., 945 R.P.M., 892.5 R.P.M., etc. In similar manner, the speeds of the several motors may be all collectively reduced a like proportionate amount through the master generator 19, thus maintaining predeterminedly fixed relative speeds between the several sections or units of the machine. In actual practice, the several motors 10 are initially individually adjusted to their respectively desired speeds by proper adjustment of the fulcrums 50, the speeds so obtained being thereafter respectively maintained constant by operation of the regulator mechanisms as described hereinbefore.

It will be understood, of course, that the invention is susceptible of various modifications and applications and that it is not necessarily limited to the arrangement and to the application hereinbefore described and illustrated. For example, the fulcrum adjusting screws 49 may be motor driven instead of hand operated as shown and a suitable switch gear may be employed in connection with such motor driven fulcrum adjusting screws as to permit their being selectively or collectively adjusted. An advantage of the motor driven screws is that they would permit remote control thereof for effecting the necessary speed adjustments of the several motors.

The gyroscope regulator mechanisms 18 being relatively small in size and compact may be located in the immediate vicinity of the motors the speeds of which are to be regulated and controlled or they may be located altogether in a single remotely located control room. Also, instead of employing a motor driven shunt field rheostat such as has been illustrated and described, it may be advisable, as is diagrammatically shown in Figure 7, to employ a carbon pile shunt field rheostat 75, this being a type of rheostat which can be very readily operated by the gyroscope regulator through a suitable pitman 76 or the like interconnecting such rheostat and the beam lever 44 of the regulator. The carbon pile rheostat 75 is so connected in circuit that any increase in speed of a particular motor tends to lift the lever 44 and so cause the carbon pile to be compressed, thereby reducing its resistance and decreasing the speed of the motor to its normal and proper value.

It will be understood that while in the machine shown in the drawings for the purpose of illustrating the applicability of the present invention, direct current motors are employed for respectively driving the several units or sections of the machine, other such types of prime movers might just as well be employed, such as steam engines, steam turbines or the like equipped with any standard mechanical or electrical speed controlling or governing devices for varying the operating speeds thereof, the operation of these devices being respectively governed and regulated by the regulator mechanisms of the present invention.

As an illustration of the adaptability of the gyroscope mechanism to this latter type of prime mover, reference is made to Figure 8 wherein the prime mover in the form of a steam turbine 77 is diagrammatically represented. While in the illustration shown, the steam turbine constitutes the prime mover for the sectional unit A, it will be understood that the load on the turbine may be other than that shown. As in the case where the electric motor constitutes the prime mover, the turbine 77 or the like has secured to the shaft thereof the alternating current generator 21 heretofore described for energizing the precession motor 22. Arranged to control and regulate the supply of steam to the turbine or engine is a throttle valve 78 or the like to which is suitably connected an arm 79. Interconnecting the free end of the throttle valve arm 78 and the lever 44 of the gyroscope regulator mechanism is a pitman 80, it being understood that the arrangement is such that any increase in speed of the turbine tends to raise the lever 44 and so cause the throttle valve 78 to move toward its closed position, thereby reducing the supply of steam to the turbine in consequence of which its speed is decreased to its normal and proper value. Of course, the arrangement shown in Figure 8 for controlling the supply of steam to the turbine or engine is merely suggestive and it may be varied within wide limits without affecting the object sought to be accomplished by the present invention.

Other modifications may be made, certain of which have been pointed out during the course of the foregoing description, all without departing from the real spirit or general principles of the invention. In view of this, it will be understood that it is intended to claim the invention broadly, as well as specifically, as indicated in the appended claims.

What is claimed as new and useful is:—

1. In a speed regulator system, in combination with a prime mover the speed of which is to be regulated, means for producing a gyroscopic torque which is directly proportional to the speed of said prime mover and which varies in accordance with any variation in said speed, and means operatively associated with the prime mover and responsive to variations of the said gyroscopic torque to regulate and control the speed of said prime mover.

2. In a speed regulator system, in combination with a prime mover the speed of which is to be controlled, gyroscopically operated means for regulating the speed of said prime mover.

3. In a speed regulator system, in combination with a prime mover the speed of which is to be regulated, a gyroscope apparatus including a spin motor and a precession motor, the spin motor being supported for bodily rotation about a substantially vertical axis and for tilting movement bodily about an axis extending substantially normal to said vertical axis, means directly associated with the prime mover for energizing one of said motors whereby to cause the same to rotate at a speed directly proportional to the speed of the prime mover, the arrangement being such that as the speed of the prime mover varies the speed of the said energized motor correspondingly varies whereby to effect a corresponding change in position of the spin motor about said horizontal axis, and means operative in accordance with the tilting movement of said spin motor about said horizontal axis to adjust the speed of said prime mover to its normal value.

4. In a speed regulator system, in combination with a prime mover the speed of which is to be regulated, a gyroscope apparatus which is operated in accordance with the speed of said prime mover, and means controlled by said gyroscope apparatus for maintaining the speed of the prime mover substantially constant.

5. In a speed regulator system, in combination with a prime mover the speed of which is to be regulated, a generator operated in accordance with the speed of said prime mover, a gyroscope regulator apparatus including a spin motor and a precession motor, said generator being electrically coupled to one of said motors whereby the latter is operated at a speed which bears a constant fixed relation to the speed of the prime mover, the spin motor being adapted to tilt about a substantially horizontal axis in response to a torque which is directly proportional to the speed of the prime mover, and means operatively associated with the spin motor and responsive to the torque generated by said motors to govern and maintain constant the speed of said prime mover.

6. In a system for regulating the speed of operation of a multiple-unit sectional-drive machine, in combination, a plurality of prime movers for respectively driving the several sections or units of the machine, a gyroscope speed regulator operatively associated with each of said prime movers for operation in accordance with the speed thereof, means operatively associated with each of said prime movers and its associated gyroscope speed regulator and controlled by the latter for maintaining the speed of each prime mover substantially constant, and means operatively associated with all of said gyroscope speed regulators for commonly controlling the operation thereof whereby to commonly vary the speed of the several prime movers.

7. In a system for regulating the speed of operation of a multiple-unit sectional-drive machine, in combination, a plurality of prime movers for respectively operating the several units or sections of the machine, a gyroscope speed regulator operatively associated with each of said prime movers, means controlled by each gyroscope regulator for maintaining the speed of the prime mover associated therewith substantially constant, and means in each of said gyroscope speed regulators for varying the adjustment thereof whereby to provide for independent speed adjustment of the several prime movers.

8. In a system for regulating the speed of operation of a multiple-unit sectional-drive machine, in combination, a plurality of prime movers for respectively driving the several units or sections of the machine, a plurality of gyroscope speed regulators respectively associated with said prime movers for operation in accordance with the respective speeds thereof, means operatively associated with each of said gyroscope speed regulators for insuring individual speed control of the several prime movers, means for individually controlling the operation of the several speed regulators whereby to provide for adjustments in the speeds of the several prime movers independently of each other, and means commonly controlling the operation of all of the speed regulators whereby to provide for common adjustment in the speeds of all of the prime movers.

9. In a speed regulator for governing the speed of a prime mover, a spin motor assembly adapted for rotation about a substantially vertical axis, a precession motor for effecting the rotation of said spin motor assembly about said axis, said spin motor being bodily tiltable about a horizontal axis substantially intersecting said vertical axis, one of said motors being operated at a speed which bears a constant fixed relation to the speed of the prime mover so that a variation in the speed of the prime mover is reflected by a corresponding inclination of the spin motor about said horizontal axis, and means operative in accordance with the tilt of said spin motor to adjust the speed of the prime mover to its normal value.

10. In a speed regulator for governing the speed of a prime mover, a spin motor assembly adapted for rotation about a substantially vertical axis, a precession motor for effecting the rotation of said spin motor assembly about said axis, said spin motor being bodily tiltable about a horizontal axis substantially intersecting said vertical axis, one of said motors being operated at a speed which bears a constant fixed relation to the speed of the prime mover so that a variation in the speed of the prime mover is reflected by a corresponding inclination of the spin motor about said horizontal axis, and means operative in accordance with the tilt of said spin motor to adjust the speed of the prime mover to its normal value, said last-mentioned means including a beam which is adapted to be raised or lowered in accordance with the direction of tilt of the spin motor.

11. In a speed regulator for governing the speed of a prime mover, a spin motor assembly adapted for rotation about a substantially vertical axis, a precession motor for effecting the rotation of said spin motor assembly about said axis, said spin motor being bodily tiltable about a horizontal axis substantially intersecting said vertical axis, one of said motors being operated at a speed which bears a constant fixed relation to the speed of the prime mover so that a variation in the speed of the prime mover is reflected by a corresponding inclination of the spin motor about said horizontal axis, and means operative in accordance with the tilt of said spin motor to adjust the speed of the prime mover to its normal value, said last-mentioned means including a beam which is adapted to be raised or lowered in accordance with the direction of tilt of the spin motor, said beam being provided with a fulcrum which is adjustable longitudinally thereof to vary the torque necessary to raise said beam whereby the ultimate speed of the prime mover may be varied as desired.

12. In a speed regulator for governing the speed of a prime mover, in combination, a spin motor and a precession motor, the spin motor being tiltable about a substantially horizontal axis at the same time that it is arranged for bodily rotation about a vertical axis intercepting said horizontal axis, said precession motor being arranged to effect the rotation of said spin motor bodily about said vertical axis, one of said motors being operated at a speed which bears a constant relation to the speed of said prime mover the other of said motors being driven at any desired speed by means independent of said prime mover, and means operatively associated with said prime mover and said speed regulator and controlled by the tilting movement of the spin motor in accordance with variations in speed of the prime mover for maintaining the ultimate speed of the latter substantially constant, said ultimate speed of the prime mover being varied as desired by varying the speed of that motor which is driven by the said independently operated means.

13. In a speed regulator, in combination, a prime mover, a generator operated in accordance with the speed of the prime mover, a gyroscope including a spin motor adapted to precess about the precession axis of the gyroscope, a motor energized by said generator for operation at a speed which bears a constant relation to the speed of the prime mover, said motor being arranged to effect the precession of said spin motor about said precession axis, and means controlled by said gyroscope for maintaining the speed of the prime mover substantially constant.

14. In a speed regulator for controlling the speed of a prime mover, in combination, a gyroscope mechanism including a spin motor arranged for bodily rotation about a fixed axis and for bodily tilting movement about an axis extending substantially normal to said fixed axis, the rotor of said spin motor being rotatable about a spin axis lying substantially in the plane of said fixed axis, said mechanism including a second motor for effecting the rotation of the spin motor bodily about said fixed axis, means for driving one of the motors of said gyroscope mechanism at a speed which bears a constant relation to the speed of the prime mover, means for driving the other of said motors at a predeterminedly fixed speed, the operation of said gyroscope mechanism being such that the spin motor tilts about its tilting axis in accordance with variations in speed of the prime mover, and means controlled by said gyroscope mechanism for maintaining the speed of the prime mover substantially constant.

15. In a speed regulator for controlling the speed of a prime mover, in combination, a gyroscope mechanism including a spin motor arranged for bodily rotation about a fixed axis and for bodily tilting movement about an axis extending substantially normal to said fixed axis, the rotor of said spin motor being rotatable about a spin axis lying substantially in the plane of said fixed axis, said mechanism including a second motor for effecting the rotation of the spin motor bodily about said fixed axis, means for driving one of the motors of said gyroscope mechanism at a speed which bears a constant relation to the speed of the prime mover, and means operatively associated with the spin motor and operated in accordance with the tilting movement thereof for maintaining the speed of the prime mover substantially constant.

16. In a speed regulator for controlling the speed of a prime mover, in combination, a gyroscope mechanism including a spin motor arranged for bodily rotation about a fixed axis and for bodily tilting movement about an axis extending substantially normal to said fixed axis, the rotor of said spin motor being rotatable about a spin axis lying substantially in the plane of said fixed axis, said mechanism including a second motor for effecting the rotation of the spin motor bodily about said fixed axis, means for driving one of the motors of said gyroscope mechanism at a speed which bears a constant relation to the speed of the prime mover, means operatively associated with the spin motor and operated in accordance with the tilting movement thereof for maintaining the speed of the prime mover substantially constant, and means for adjusting the operation of said last-mentioned means whereby to increase or decrease, as desired, the speed of said prime mover.

17. In a speed regulator for controlling the speed of a prime mover, in combination, a gyroscope mechanism including a spin motor and a precession motor, the spin motor being arranged for rotation about the precession axis of the gyroscope, said rotation being effected by said precession motor, the rotor of the spin motor being rotatable about a spin axis which lies substantially in the plane of said precession axis, a generator driven by the prime mover for driving the precession motor at a speed which bears a constant relation to the speed of the prime mover, and a second generator for energizing the spin motor so that the rotor thereof rotates at a predeterminedly fixed speed, and means operatively associated with the spin motor and responsive to the torque generated by said motors as the speed of the prime mover rises above or drops below a predetermined constant speed for maintaining the prime mover at said substantially constant speed.

18. In a speed regulator for controlling the speed of a prime mover, in combination, a gyroscope mechanism including a spin motor and a precession motor, the spin motor being arranged for rotation about the precession axis of the gyroscope, said rotation being effected by said precession motor, the rotor of the spin motor being rotatable about a spin axis which lies substantially in the plane of said precession axis, a generator driven by the prime mover for driving the precession motor at a speed which bears a constant relation to the speed of the prime mover, and a second generator for energizing the spin motor so that the rotor thereof rotates at a predeterminedly fixed speed, and means operatively associated with the spin motor and responsive to the torque generated by said motors as the speed of the prime mover rises above or drops below a predetermined constant speed for maintaining the prime mover at said substantially constant speed, the power supplied by said second generator for effecting the rotation of the spin motor about its spin axis being variable as desired to vary the speed of rotation of the spin motor rotor about said spin axis whereby to raise or lower the speed of the prime mover above or below said predetermined initial constant speed.

19. In a speed regulator for controlling the speed of a prime mover, in combination, a gyroscope mechanism including a spin motor which is arranged for angular displacement about a given torque axis, means operatively associated with the prime mover for controlling the speed thereof, and means operatively associated with the gyroscope mechanism to effect the operation of said speed controlling means in accordance with the angular displacement of said spin motor about said torque axis.

20. In an apparatus for controlling the speed of an electric motor, means for producing a gyroscopic torque which is directly proportional to the speed of said motor, and means actuated in accordance with said gyroscopic torque for controlling and maintaining constant the speed of said motor.

21. In an apparatus for controlling the speed of a prime mover, a gyroscope speed regulator mechanism including a spin motor which is arranged to precess about a fixed axis, means for varying the precession velocity of said spin motor about said precession axis in accordance with the variations in speed of said prime mover, and means controlled by said gyroscope mechanism for maintaining the speed of the prime mover substantially constant.

22. In a system for regulating and controlling the speed of a prime mover, in combination, means operatively associated with the prime mover for regulating the supply of the energizing medium thereto, a gyroscope mechanism energized in accordance with the speed of the prime mover whereby to establish a gyroscopic torque the value of which bears a direct and constant relation to the speed of the prime mover, and means controlled by said gyroscope mechanism and actuated in accordance with said torque to regulate the flow of the energizing medium to said prime mover.

23. In an apparatus for regulating the speed of a prime mover, in combination, a gyroscope mechanism including means for establishing a torque which bears a direct relation to the speed of the prime mover, a lever system including a lever and a fulcrum which is positionally adjustable longitudinally of the lever, means for moving said lever about said fulcrum in accordance with the torque established as aforesaid, and means operatively associated with the prime mover and controlled by the movement of said lever for maintaining the speed of the prime mover substantially constant.

24. In an apparatus for regulating the speed of a prime mover, in combination, a gyroscope mechanism including means for establishing a torque which bears a direct relation to the speed of the prime mover, a lever system including a lever and a fulcrum which is positionally adjustable longitudinally of the lever, means for moving said lever about said fulcrum in accordance with the torque established as aforesaid, and means operatively associated with the prime mover and controlled by the movement of said lever for maintaining the speed of the prime mover substantially constant, the said constant speed of the prime mover being varied as desired within certain limits by positional adjustment of said fulcrum longitudinally of said lever.

25. In a system for regulating the speeds of several prime movers, in combination, a generator operatively associated with and driven by each of said prime movers, a gyroscope mechanism including a spin motor and a precession motor operatively associated with each of said prime movers, one of said motors of each gyroscope mechanism being supplied with current from a generator operatively associated with the corresponding prime mover whereby to establish gyroscopic torques in the several gyroscopic mechanisms which respectively bear direct relations to the speeds of the several prime movers, means operated independently of the prime movers for commonly driving all of the other motors of said gyroscope mechanisms at predetermined uniform speeds, and means respectively controlled by each gyroscope mechanism for maintaining the speed of the prime mover associated therewith substantially constant.

26. In a system for regulating the speeds of several prime movers, in combination, a plurality of gyroscopically operated speed regulators respectively associated with the several prime movers, a plurality of generators respectively driven by the prime movers for operating the gyroscopic speed regulators to establish therein gyroscopic torques which respectively bear direct relations to the speeds of the several prime movers, means respectively operated by the several gyroscopic speed regulators for maintaining the speeds of the several prime movers substantially constant, and means included in each of said gyroscopic speed regulators for effecting independent adjustment in the speed of any one prime mover.

27. In a system for regulating the speeds of several prime movers, in combination, a plurality of gyroscopically operated speed regulators respectively associated with the several prime movers, a plurality of generators respectively driven by the prime movers for operating the gyroscopic speed regulators to establish therein gyroscopic torques which respectively bear direct relations to the speeds of the several prime movers, means respectively operated by the several gyroscopic speed regulators for maintaining the speeds of the several prime movers substantially constant, means included in each of said gyroscopic speed regulators for effecting independent adjustment in the speed of any one prime mover, and means common to all of said gyroscopic speed regulators for effecting adjustment in the speeds of all of said prime movers simultaneously and without affecting the speed ratios therebetween.

WALTER C. KENNEDY.